United States Patent
Glachet et al.

(10) Patent No.: US 7,282,176 B2
(45) Date of Patent: Oct. 16, 2007

(54) METHOD OF MOUNTING A PIECE OF HANDLING EQUIPMENT TO A CONTAINMENT CHAMBER CONTAINING A STERILE MEDIUM

(75) Inventors: Charles Glachet, Vendome (FR); Jean-Pierre Brossard, Chatou (FR)

(73) Assignee: La Calhene, Vendome Cedex (FR)

( * ) Notice: Subject to any disclaimer, the term of this patent is extended or adjusted under 35 U.S.C. 154(b) by 477 days.

(21) Appl. No.: 10/499,654

(22) PCT Filed: Jan. 7, 2003

(86) PCT No.: PCT/FR03/00019

§ 371 (c)(1),
(2), (4) Date: Jun. 29, 2004

(87) PCT Pub. No.: WO03/057431

PCT Pub. Date: Jul. 17, 2003

(65) Prior Publication Data

US 2005/0217102 A1    Oct. 6, 2005

(30) Foreign Application Priority Data

Jan. 9, 2002    (FR) .................................. 02 00200

(51) Int. Cl.
*A61L 2/02* (2006.01)
(52) U.S. Cl. ........................... 422/28; 422/26; 220/315

(58) Field of Classification Search .................. 422/26, 422/28; 220/315
See application file for complete search history.

(56) References Cited

U.S. PATENT DOCUMENTS 5,732,843 A * 3/1998 Glachet et al. ............. 220/315

FOREIGN PATENT DOCUMENTS

| EP | 0 720 895 | 7/1996 |
| EP | 0 730 907 | 9/1996 |
| EP | 0 748 967 | 12/1996 |
| EP | 0 830 896 | 3/1998 |
| GB | 2 102 719 | 2/1983 |
| JP | 2000-237606 | 9/2000 |

* cited by examiner

*Primary Examiner*—Gladys Jp Corcoran
*Assistant Examiner*—Sean E. Conley
(74) *Attorney, Agent, or Firm*—Oblon, Spivak, McClelland, Maier & Neustadt, P.C.

(57) ABSTRACT

A method to mount handling equipment on an interface of a confinement chamber that is to contain a sterile environment. In the method a unit including the handling equipment is prepared and sterilized, and the chamber and a hidden part of the interface are sterilized after coupling impervious tooling to a chamber flange and partially opening the chamber door. The unit is then coupled to the interface. Finally, the double door formed by the equipment door and the chamber door connected to one another is opened, using a handle provided for this purpose on the equipment door.

5 Claims, 4 Drawing Sheets

METHOD OF MOUNTING A PIECE OF HANDLING EQUIPMENT TO A CONTAINMENT CHAMBER CONTAINING A STERILE MEDIUM

TECHNICAL FIELD

This invention relates to a method for assembling handling equipment such as a glove on a wall of a confinement chamber containing a sterile environment or both a sterile and toxic environment.

The method according to the invention may be used in all of the fields wherein handling has to be carried put periodically in a sterile environment. Among these fields can be mentioned by way of example the pharmaceutical, medical, chemical, electronic fields, etc.

STATE OF THE TECHNIQUE

For many years, confinement chambers have been used in order to define a closed volume with respect to the external atmosphere.

When the volume defined by the chamber contains a dangerous atmosphere, as is particularly the case in the nuclear industry, the walls of the chamber have the function of preventing this dangerous atmosphere from escaping from the confined volume.

On the contrary, when the volume defined by the chamber contains a sterile atmosphere, the walls of the chamber have the function of preventing this sterile atmosphere from being polluted by the external atmosphere.

In order to be able to operate inside the sealed volume defined by the confinement chamber, it is necessary to have, at least temporarily, one or more pieces of handling equipment such as gloves, a half-suit, etc. To this end, the walls of the chamber generally comprise at least one opening defined by a flange which is an integral part of the wall and on which the handling equipment is mounted.

Handling equipment such as a glove or a half-suit is made from flexible material such as latex, PVC, neoprene, etc. It constitutes both a potential source of leaks and a wear part. This has led the designers of confinement chambers to provide for the replacement of handling equipment without the loss of the confinement. To take account of the possible presence of micro-leaks that cannot be detected in the handling equipment, it is common to block, by means of a door, the opening of the flange carrying this equipment, when it is not in use.

When the atmosphere contained in the volume defined by the confinement chamber is a dangerous atmosphere, the replacement of a piece of handling equipment such as a glove is usually carried out from outside the chamber, using suitable tooling. If this replacement leads to the introduction into the chamber of a small quantity of air initially situated outside of the chamber, this is of no consequence. In fact, the external atmosphere remains protected from the atmosphere contained in the confinement chamber.

In return, it can be easily understood that this technique cannot be used in the case of the confinement chamber containing a sterile volume. In fact, it would lead to the introduction of polluted air into this sterile volume.

For this reason, the replacement of the handling equipment equipping a sterile chamber is usually carried out from inside the chamber, using other handling equipment present in it and with the use of a double door transfer device permitting communication between the inside of the confinement chamber with an external transport container.

According to these usual techniques, a container whose inside has been sterilized beforehand is coupled to the flange, and the former contains at least one piece of replacement handling equipment. This container is then brought into communication with the inside of the chamber by opening the double door from the inside of the chamber, then introducing the replacement handling equipment into the chamber, using the handling equipment present in the confinement chamber. Changing one of these pieces of handling equipment is then carried out from inside the chamber using the remaining handling equipment.

This description of the state of the technique shows that the existing techniques do not allow a piece of handling equipment of a confinement chamber containing a sterile volume to be replaced operating directly from the outside of the chamber.

In the case of a chamber containing a sterile volume, this means imposing the presence of several pieces of handling equipment and at least one access orifice to permit a container to be coupled. Furthermore, this prevents the replacement of all of the pieces of handling equipment by the doors or covers when this equipment is not used.

Moreover, the operations carried out from inside the chamber with the help of handling equipment equipping the latter are longer and more difficult than those carried out directly from the outside, as is the case when the sterile environment is also toxic.

Also known from the document GB-A-2 102 719 is a device permitting a container or a handling glove to be mounted onto an interface provided for this purpose, in a confinement chamber such as a glove box. The interface of the confinement chamber comprises a fixed flange which defines an opening that is normally closed by a chamber door. The container and the handling glove comprise a moving flange which also defines an opening that is normally closed by a glove or container door.

According to the document GB-A-2 102 719, when the moving flange is coupled to the fixed flange, the two doors are automatically connected to one another to form a double door. The glove door is equipped with a handle on its face orientated towards the inside of the glove, such that an operator may turn the double door using the glove, to uncouple the flanges and place it inside the confinement chamber.

The device described in this document is designed to be used with a confinement chamber such as a glove box containing radioactive or dangerous materials. The problem raised by the possible presence of a sterile atmosphere inside the chamber is not covered and no solution is proposed to this problem.

In the document EP-A-0 748 967, there is also proposed a cover designed to be placed on the door of a recipient designed to circulate a sterilizing vapor inside the glove box, in order to ensure the sterilization. To this end, the recipient is coupled to the glove box by means of a double door connecting device. The cover is placed on the door of the recipient, before it is connected to the glove box. It permits the door to be opened to sterilize the contour, by using the sterilization means associated to the recipient.

DESCRIPTION OF THE INVENTION

The purpose of the invention is to resolve at least partially the problems raised, according to the prior art, by mounting handling equipment onto a confinement chamber that is to contain a sterile atmosphere.

More precisely, the purpose of the invention is to permit, in the shortest possible time, handling equipment to be mounted onto a confinement chamber that is to contain a sterile atmosphere, ensuring efficient sterilization of the hidden part of the interface of the confinement chamber.

In accordance with the invention, this result is obtained by means of a mounting method for handling equipment onto an interface of a confinement chamber, comprising a fixed flange defining a chamber opening sealed by a chamber door, the said method comprising the following steps:

preparation of an assembly comprising the handling equipment, mounted on a moving flange defining an equipment opening sealed by an equipment door;

coupling of the assembly onto the interface, so as to connect the moving flange to the fixed flange and the equipment door to the chamber door;

opening of the double door formed by the equipment door and the chamber door connected to one another;

wherein, the confinement chamber having to contain a sterile atmosphere, the preparation step of the said assembly is followed by the following steps:

sterilization of the said assembly;

sterilization of the confinement chamber and of a hidden part of the interface, after coupling of impervious tooling onto the fixed flange and partial opening of the chamber door.

The use of impervious tooling, coupled to the confinement chamber flange, to sterilize the hidden part of the interface at the same time as the chamber, before the handling assembly is coupled to the interface, permits the hidden part of the interface to be sterilized efficiently in the shortest possible time. This constitutes an essential advantage with respect to another possible technique, according to which the confinement chamber and the handling assembly would be sterilized at the same time. In fact, this assembly is generally made, at least partially, from flexible material such as vinyl, which would create the risk of folds forming and thus create hidden zones which would not be sterilized. Furthermore, the flexible material would absorb the sterilizing agent and thus increase the ventilation time required for sterilization.

According to one preferred embodiment of the invention, the previously mentioned assembly is coupled to the interface by commanding its rotation by means of a removable handling part mounted beforehand onto the moving flange.

Advantageously, the imperviousness of the handling equipment is controlled by connecting a control box onto the fixed flange, after coupling the said assembly and opening the double door. This control can also be carried out by disconnecting the previously mentioned assembly from the interface and connecting it to an independent control box.

Again advantageously, the double door is opened and it is placed in the confinement chamber by means of a handle mounted onto the equipment door, inside the equipment.

In the preferred embodiment of the invention, the handling equipment is a glove.

BRIEF DESCRIPTION OF THE DRAWINGS

We will now describe, by way of illustrative example and in no way restrictively, a preferred embodiment of the invention, referring to the appended drawings wherein.

DETAILED DESCRIPTION OF A PREFERRED EMBODIMENT OF THE INVENTION

Figure 1:
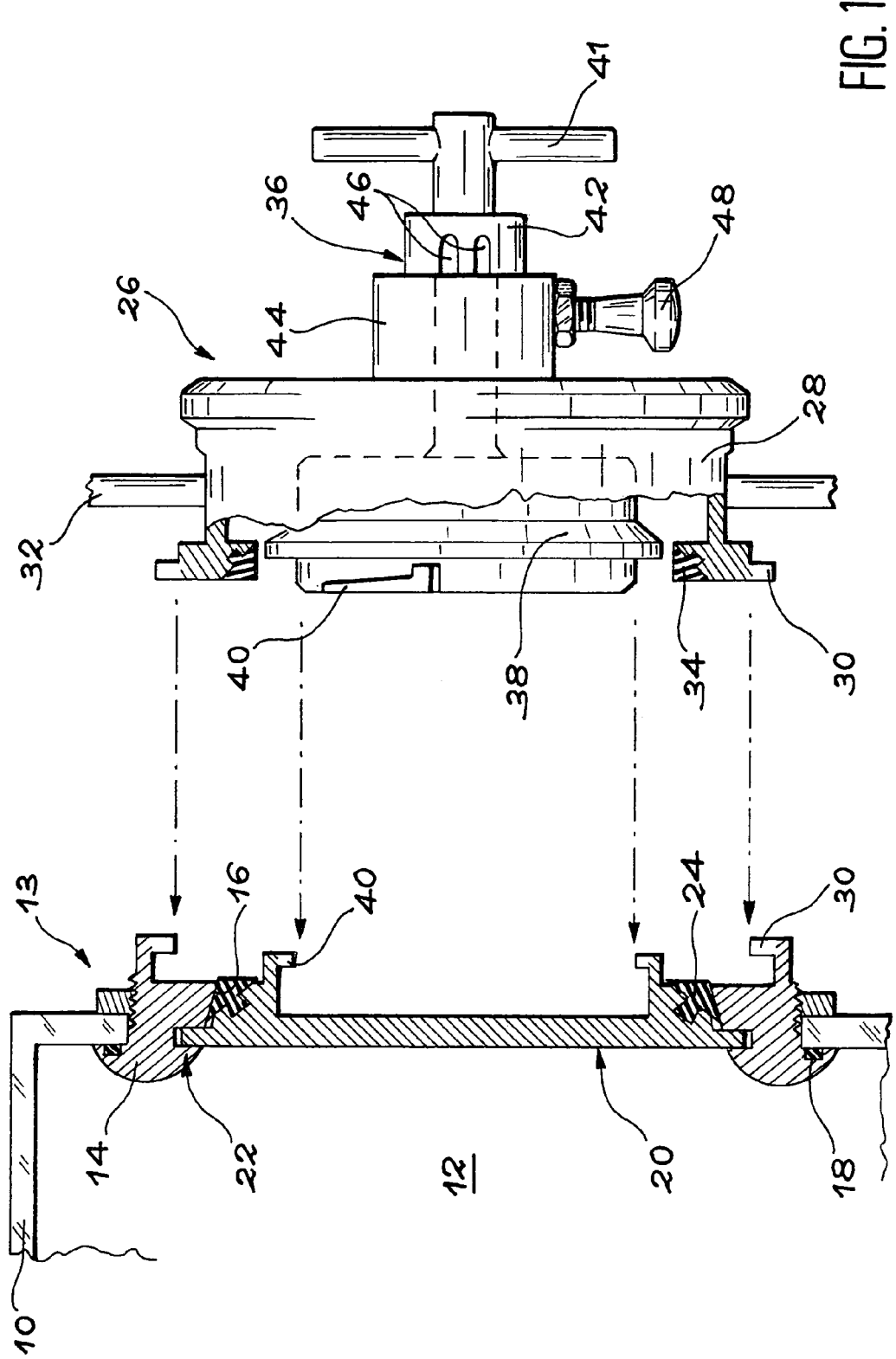
FIG. 1 is a cross sectional end view, which illustrates diagrammatically the coupling of impervious tooling onto an interface of a confinement chamber.

In the figures, reference 10 designates the wall of a confinement chamber of which only a small part is visible. This wall defines a volume 12 intended to contain a sterile environment and for which the confinement must be preserved from the external atmosphere at all times. The wall 10 of the confinement chamber may be made in any material suitable of preserving the confinement, within the scope of the invention.

The wall 10 of the confinement chamber has one or more interfaces 13 permitting various pieces of handling equipment to be mounted onto the said chamber and to replace them when necessary, without rupture of the confinement. Each interface 13 comprises a circular shaped, fixed flange 14, mounted imperviously onto the wall 10 of the confinement chamber, in order to define a circular chamber opening 16 internally.

The fixed flange 14 on the wall 10 is mounted so as to compress an annular seal 18 between them.

A chamber door 20 seals, normally imperviously, the opening 16 defined by the fixed flange 14. More precisely, impervious connection means 22, of the bayonet type, are provided to permit the impervious connection of the chamber door 20 to the fixed flange 14. The impervious bayonet connection means 22 have a well known structure, which will not be described in detail here. They are formed of tongues and matching slots respectively formed in the fixed flange 14 and on the periphery of the chamber door 20. The impervious connection means 22 may pass from a coupled state to an uncoupled state, and vice versa, under the effect of a rotation of the chamber door 20 around its axis. By way of example, the angle of rotation of the chamber door 20 for passing from the coupled state to the uncoupled state may be around 30°.

An annular seal 24, of a more or less triangular section, is mounted around the periphery of the chamber door 20, in its part which faces the outside of the chamber. When the door 20 is coupled to the flange 14, this annular seal 24 is in impervious contact with the inside surface of the flange 14 defining the opening 16.

It should be noted that the co-operation between the chamber door 20 and the fixed flange 14 is such that the chamber door 20 can only be extracted from the opening 16 towards the inside of the confinement chamber.

Figure 2:
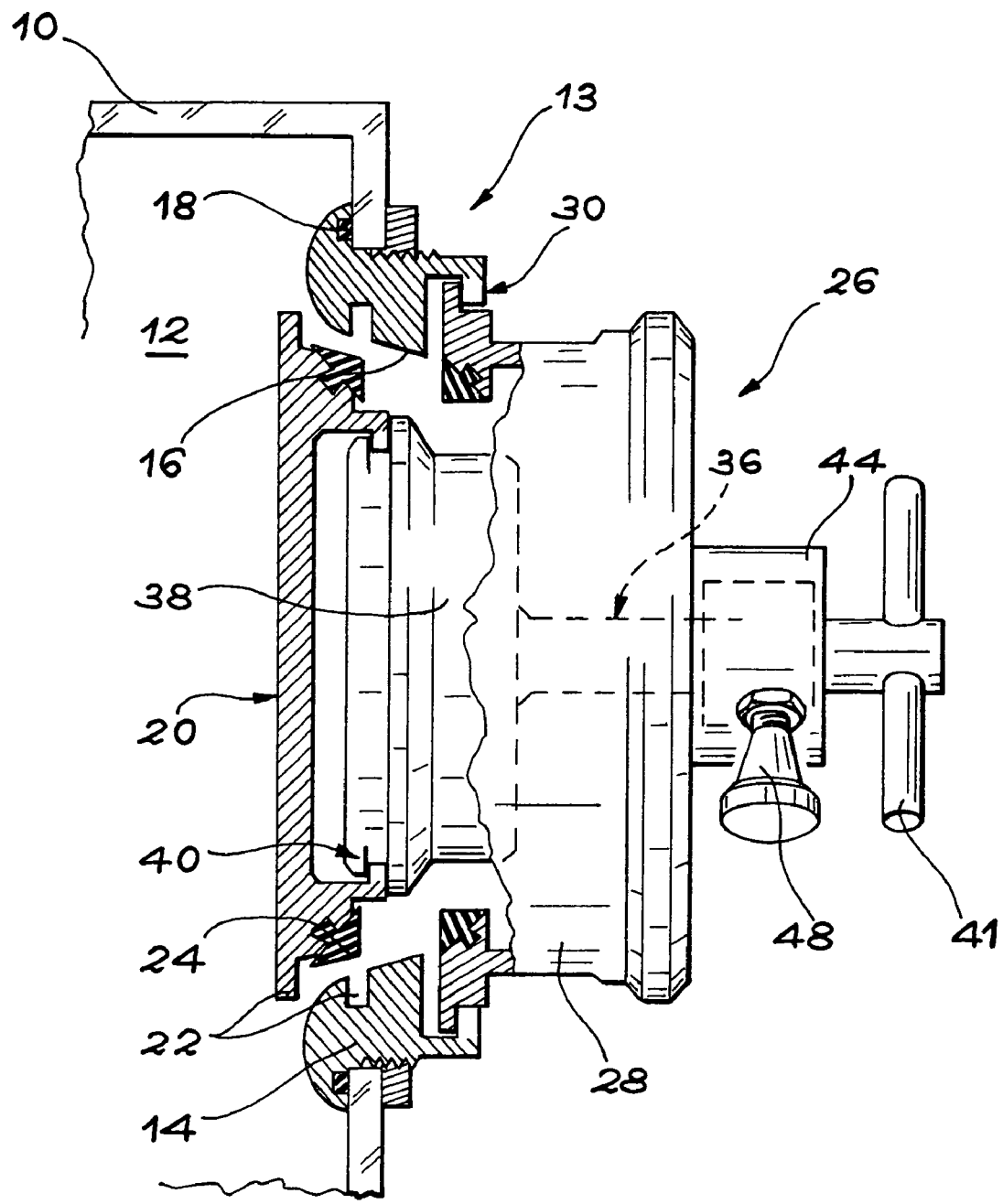
FIG. 2 is a view comparable to that of FIG. 1, which illustrates diagrammatically the partial opening of the chamber door with the use of impervious tooling, permitting a hidden part of the interface to be sterilized at the same time as the chamber.

As shown diagrammatically in FIGS. 1 and 2, the sterilization of a hidden part of the interface 13 is carried out at the same time as that of the volume 12 defined inside the confinement chamber, after coupling a piece of impervious tooling 26 onto the interface 13. More precisely, the hidden part of the interface 13 which is sterilized comprises the part of the annular seal 24 which is normally in contact with the inside surface of the flange 14 defining the opening 16, as well as the said inside surface.

As illustrated in FIGS. 1 and 2, the impervious tooling 26 comprises a bell shaped outside envelope 28, whose open end is capable of being coupled to the fixed flange 14 by means of impervious connection means 30. These connection means are in the form of tongues and matching slots respectively formed on the open end of the inside envelope 38 and the outside face of the door 20. The tongues and slots engage with each another by means of a rotation of the moving part 36.

The rotation of the moving part 36 is controlled by means of a handle 40 attached to a cylindrical portion 42 of the moving part, at the end of this portion 42 situated on the outside of the outside envelope 28. The other end of the cylindrical portion 42 is attached to the inside envelope 38. The cylindrical portion 42 traverses a tubular central part 44 through its axis, the latter being attached to the base of the outside envelope 24, such that the moving part 36 can move in rotation and translation with respect to the outside envelope. Sealing means (not shown) are positioned between the moving part 36 and the outside envelope 28, in order to preserve the confinement from the inside of the said envelope 28, when the latter is coupled to the interface 13.

Guide means are positioned between the outside envelope 28 and the moving part 36 to limit the previously mentioned movements to a translational movement followed by a rotational movement, and vice versa.

In the embodiment shown, these guide means comprise at least one guide groove 46 machined on the rod 42 and a spindle 48 that transverse radially the tubular central part 44 of the outside envelope 28. The end of the spindle 48 penetrates into the groove 46, so as to impose a predetermined relative movement of the moving part 36 with respect to the outside envelope 28. A button that is attached to the spindle 48 permits an operator to clear the spindle from the groove, when this is necessary.

As shown diagrammatically in FIG. 1, the impervious tooling 26 is first coupled by joining the impervious connection means 30, 40, provided, on the one hand between the outside envelope 28 and the flange 14 of the interface 13 and, on the other hand, between the inside envelope 38 and the door 20. This coupling is made by turning the outside envelope 28, for example by 30°, using handling levers 32.

Then partial opening of the chamber door 20 is commanded using the handle 40, as illustrated in FIG. 2. To this end, the operate actuates firstly the handle 40 in rotation, so as to uncouple the impervious connection means 22 provided between the chamber door 20 and the fixed flange 14. This rotation of the handle 40 is made possible by the co-operation of the spindle 48 with the groove 46.

The operator then commands a translation of the moving part 36 towards the inside of the confinement chamber, by pushing the handle 40. In this way, partial opening of the chamber door 20 is achieved, which has the effect of clearing the seal 24 from the inside surface of the flange 14 defining the chamber opening 16, as illustrated in FIG. 2a.

The operator then carries out the sterilization of the confinement chamber, using classic sterilization means (not shown) provided for this purpose. These sterilization means may use in particular chemical vapours.

In accordance with the invention, the sterilization of the inside volume 12 of the confinement chamber is accompanied by sterilization of the hidden part of the interface 13, which is to say the surfaces normally in contact with the seal 24 and the flange 14. When the sterilization is complete, the handle 40 is moved in the opposite direction so as to close the chamber door 20 and uncouple the impervious tooling 26. We are then in a situation that is analogue to that of FIG. 1.

In parallel, the handling equipment 52 that we wish to mount on the interface 13 is prepared, to form an assembly 50 (FIG. 3) ready to be mounted on the said interface.

To this end, the assembly 50 comprises a moving flange 54, which defines an equipment opening 56 normally sealed imperviously by an equipment door and the handling equipment 52, flexible and impervious, constituted in this case by a glove. When the door 58 is placed in the flange 54, this assembly defines inside a sterile space 60 between the door 58, the flange 54 and the handling element 52. The space 60 may be sterilized using any suitable means, for example by placing the assembly 50 in an impervious sachet and by using a gamma radiation sterilization technique.

More precisely, the equipment door 58 is designed to seal imperviously the equipment opening 56 formed in the moving flange 54. To this end, bayonet type coupling means 62 are provided between the door 58 and the flange 54. Like the other impervious coupling means 22, 30 and 40, these impervious coupling means 62 are made in a way well known to the specialists, such that no detailed description will be made. The impervious coupling means 62 comprise complementary mechanisms respectively formed inside the moving flange 54 and on the outside of the equipment door 58, as well as an annular seal 64, of more or less triangular section, mounted in the moving flange 54 on the face of this flange designed to come into contact with the outside face of the fixed flange 14. The bayonet type impervious coupling means 62 are actuated by rotation, for example of around 30°, of the equipment door 58 around its axis. This rotation makes it possible to pass the coupling means 62 from a coupled state illustrated in FIG. 3 to an uncoupled state illustrated in FIG. 4. When the equipment door 58 is coupled to the moving flange 54, the outside surface of the door is in impervious contact with the seal 64.

Figure 4:
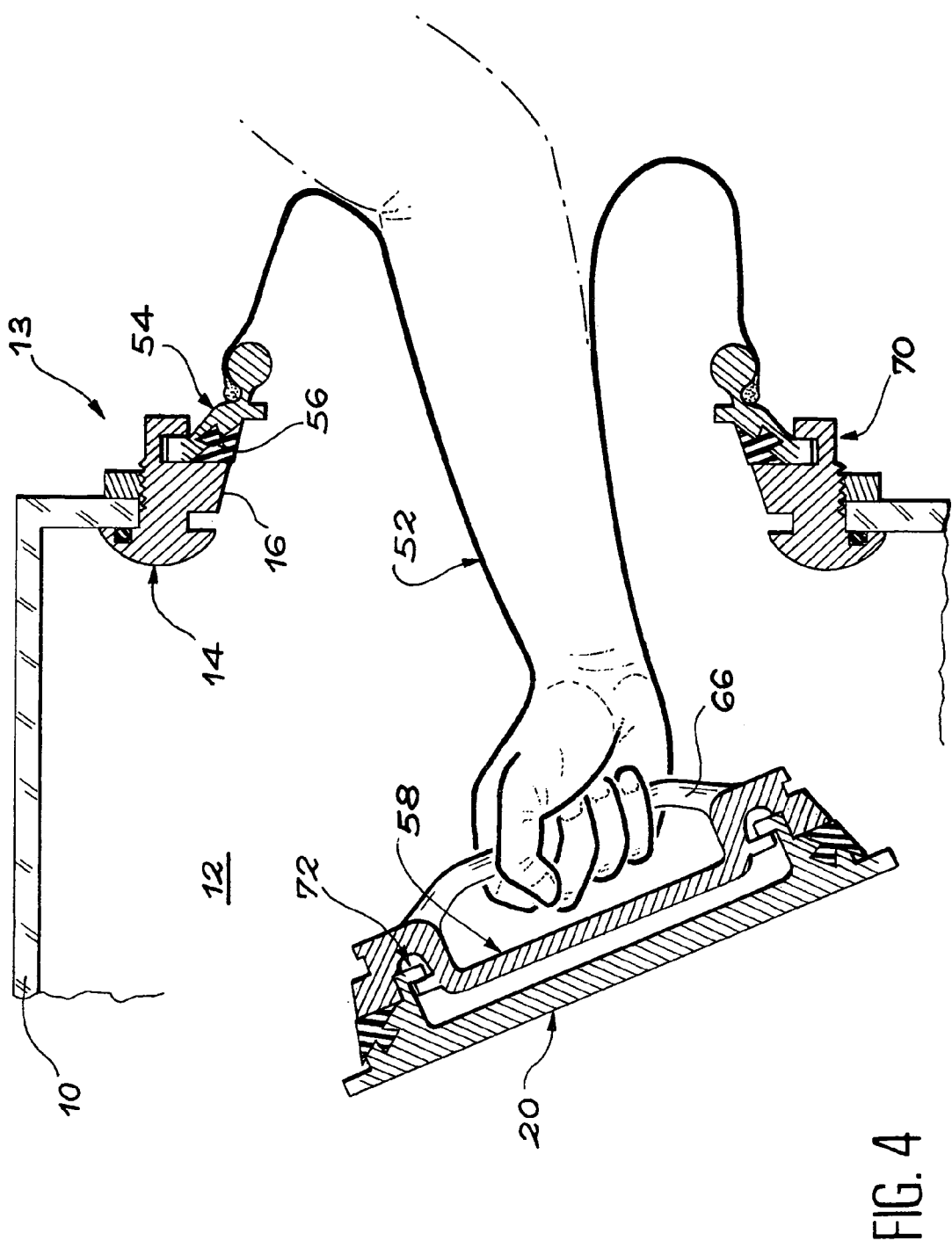
FIG. 4 is a view comparable to that of FIGS. 1 to 3, which illustrates diagrammatically the opening of the double door.

As illustrated especially in FIG. 4, the co-operation of the moving flange 54 and the equipment door 58 is such that the latter can only be opened towards the outside with respect to the sterile space 60 defined between the flange 54, the door 58 and the handling equipment 52.

Figure 3:
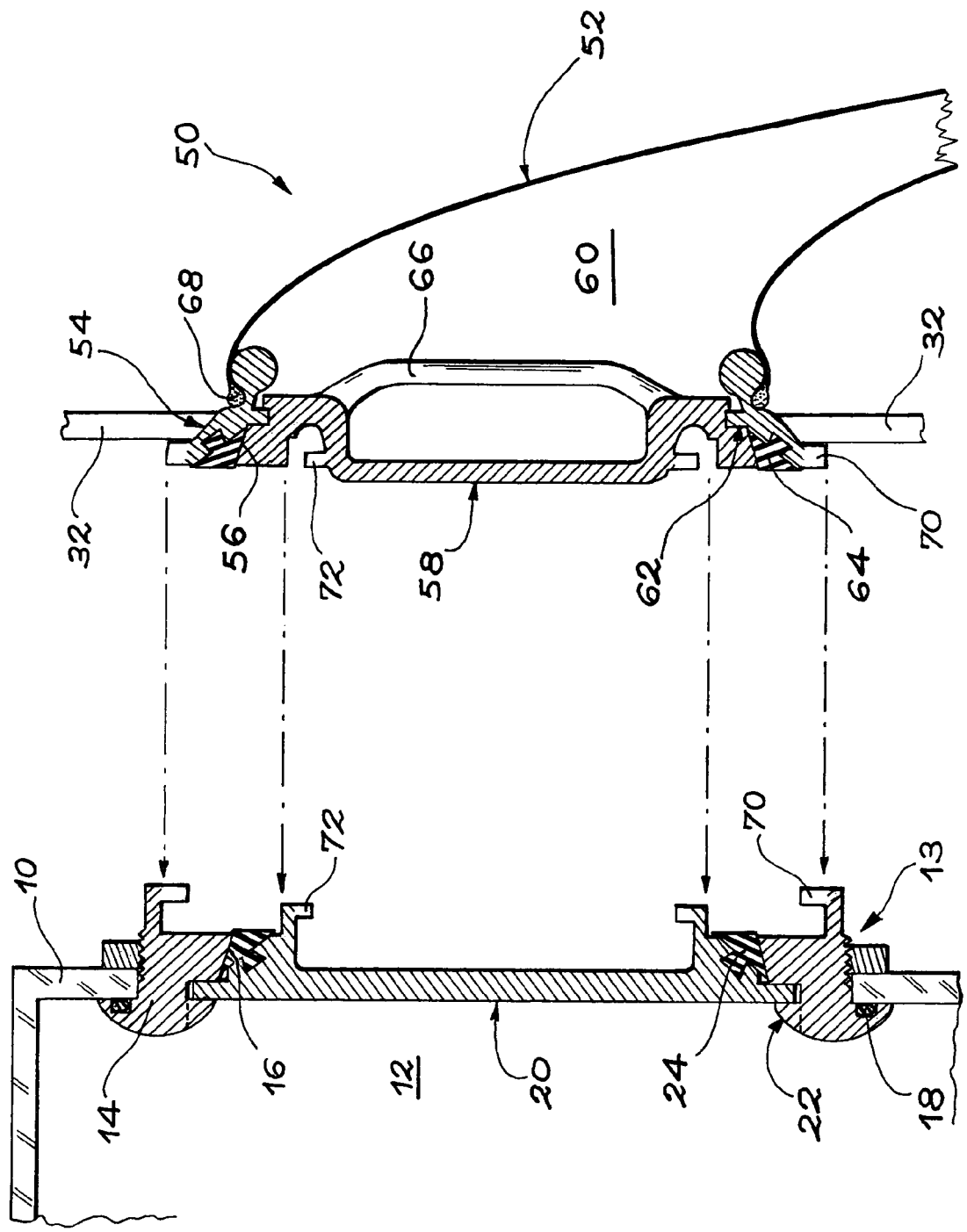
FIG. 3 is a view comparable to that of FIGS. 1 and 2, which illustrates diagrammatically the coupling of an assembly comprising a piece of handling equipment on the interface of the confinement chamber.

As illustrated in FIGS. 3 and 4, the equipment door 58 is equipped with movement means 66, on its faced orientated towards the sterile space 60 and the handling equipment 52 when the two impervious coupling means 62 are coupled. In the embodiment shown, these movement means 66 are constituted by a handle. As can be understood more clearly further on, this handle 66 permits the equipment door 58 to be moved so as to actuate the impervious coupling means 22 and 62 in particular, when handling equipment 52 is to be fitted or replaced.

It should be noted that the use of a handle 66 as movement means is particularly suited to the case where the impervious coupling means 22 and 62 are of the bayonet type. If these impervious coupling means are of different types, the handle 66 may be replaced by movement means of a different nature, designed to actuate the various coupling means.

In the embodiment illustrated in FIGS. 3 and 4, the handling equipment 52 is mounted on the equipment flange 54 by means of an annular bead 68 formed at the open end of this handling equipment. The bead 68 is seated in a groove formed on the periphery of the equipment flange 54. This assembly is only provided by way of example, and any other type of assembly which provides an impervious connection of the handling equipment 66 on the flange 54 can also be used.

The assembly 50 furthermore comprises impervious coupling means 70 by which the equipment flange 54 may be coupled to the chamber flange 22 and impervious coupling means 72 by which the equipment door 54 may be coupled to the chamber door 20.

The impervious coupling means 70 and 72 are of the bayonet type and comprise, on the face of the fixed flange 14 orientated towards the outside of the chamber and on the outside face of the chamber door 20, parts in common with the coupling means 30 and 40 previously described in reference to FIGS. 1 and 2. These mechanisms provided on the chamber flange 14 and on the chamber door 20 are designed to co-operate with complementary mechanisms formed on the outside periphery of the moving flange 4 and on the outside face of door 58, such that a rotation of a given angle, for example around 30°, of the assembly 50 permits the impervious coupling means 70 and 72 to be passed from an uncoupled state illustrated in FIG. 3 to a coupled state illustrated in FIG. 4, and vice versa.

The rotation of the assembly 50 is commanded by handling levers 32 mounted on the moving flange 54. The handling levers 32 may be the same as those used to command the rotation of the impervious tooling 26. To this end, the handling levers 32 can advantageously be dismounted.

The impervious coupling means 70 and 72 are made using techniques familiar to specialists, such that a detailed description will not be made.

In the coupled state of the impervious coupling means 70 and 72, the seal between the flanges 14 and 54 is ensured by the contact of the seal 64 seated on the moving flange 54 which moves to rest against the face of the fixed flange 14 orientated towards the outside of the confinement chamber and by the contact of the seal 16 mounted on the chamber door 20 which moves to rest against the face of the equipment door 58 orientated towards the outside with respect to the sterile space 60.

In FIG. 3, the assembly 50 is shown in the state that it is in when no handling is planned to be carried out inside the sterile volume 12. In these conditions, the impervious coupling means 22 are coupled, which is to say that the opening 16 formed in the fixed flange 14 is sealed imperviously by the chamber door 20.

When handling is to be carried out inside the impervious chamber, the assembly 50 is coupled to the fixed flange 14 and onto the chamber door 20, as is shown diagrammatically by the arrows in FIG. 3. During this coupling operation, the complementary mechanisms of the impervious coupling means 70 and 72 engage inside one another.

By a rotation of the assembly 50, commanded from outside the chamber by the handling levers 32, the operator brings the impervious coupling means 70 and 72 in their coupled state. The moving flange 54 is then locked imperviously onto the fixed flange 14. Similarly, the equipment door 58 is locked onto the chamber door 20 to form a double door.

Via the handling equipment 52, which is to say by putting on the glove forming this equipment in the embodiment illustrated in FIG. 4, the operator then actuates the handle 66 so as to turn the double door in the direction corresponding to the uncoupling of the impervious coupling means 22 and 62.

More precisely, when the double door is rotated, commanded by the handle 66, the equipment door 58 is uncoupled from the moving flange 54 and the chamber door 20 is uncoupled from the fixed flange 14 at the same time. This rotation may correspond to a rotation of around 30° for example of the doors 58 and 20.

Consequently, the operator may place the double door thus formed inside the confinement chamber, still using the handle 66 and via the handling equipment 52, as illustrated in FIG. 4. The handling equipment is then in its operational state, without any operations being carried out from the inside of the isolator and without any rupture of the confinement at any time.

From this point of view, it is important to observe that given that the space 60 initially trapped inside the assembly 50 between the door 58, the flange 54 and the handling equipment 52 was sterile, the sterile character of the volume 12 defined by the wall 10 of the isolator is not affected by this operation. The sterile nature of the volume 12 is also preserved by the fact that the hidden part of the interface 13 has been sterilized at the same time as the volume 12, thanks to the impervious tooling 26.

When the operations inside the confinement chamber have been completed, the reverse operations of those which have just been described make it possible to bring the chamber back to its initial state, illustrated in FIG. 3. The confinement of the sterile volume 12 is then preserved by the chamber door as long as a piece of handling equipment 52 is not put back into place.

The integrity of the handling equipment 52 may be controlled when desired. To this end, the operators have a check unit (not shown) in which they place the equipment to be checked. More precisely, the operator connects the unit onto the fixed flange 14 and carries out an "in situ" check either by a pressure drop method, or by an oxygen leak method.

When a piece of handling equipment 52 is damaged, this equipment is dismounted with the assembly 50 to return it to the state illustrated in FIG. 3, the same as when the operations have been completed. The operator then installs new or undamaged handling equipment 52, coupling to the fixed flange 14 and the chamber door 20 another assembly 50 comprising this equipment 52, to bring the chamber back to its active state as previously described in successive reference to FIGS. 3 and 4.

According to one essential characteristic of the invention, it is important to observe that all of the se operations are carried out entirely from the outside of the confinement chamber, without any rupture of the said confinement and without the sterile atmosphere contained in the chamber being affected.

Of course, it can be understood that the method that has been described in the case of the handling equipment 52 being formed by a glove can also be used in the case where this element is constituted by a half-suit.

Furthermore, and as already noted, the various impervious coupling means may be constituted by other devices than bayonet devices. In this case, the handle 66 may be replaced by any other actuating device such as a lever, a wheel, etc. permitting these impervious coupling devices to be actuated.

Finally, it should be noted that the interface 13 advantageously comprises safety devices (not shown) which permit operations that could risk rupturing the confinement of the chamber or the assembly 50 to be avoided. These safety devices, familiar to specialists of double door transfer devices, especially prevent any opening of one or the other of the doors 20 and 58 when the impervious coupling means 70 are not coupled, as well as any uncoupling of these impervious coupling means 70 as long as the doors 20 and 58 are not coupled to their respective flanges 14 and 54.

The invention claimed is:

1. A method for sterilizing by mounting handling equipment on an interface of a confinement chamber including a fixed flange defining a chamber opening sealed by a chamber door, the method comprising:
  preparing an assembly including the handling equipment, mounted on a moving flange defining an equipment opening sealed by an equipment door;
  coupling the assembly onto the interface, to connect the moving flange to the fixed flange and the equipment door to the chamber door;
  opening a double door formed by the equipment door and the chamber door connected to one another;
  wherein the confinement chamber is configured to contain a sterile atmosphere, and the preparing of the assembly is followed by:
    sterilizing the assembly; and
    sterilizing the confinement chamber and a hidden part of the interface, after coupling impervious tooling onto the fixed flange and partial opening of the chamber door, wherein imperviousness of the handling equipment is controlled by connecting a control unit to the fixed flange, after coupling the assembly and the double door opening.

2. A method for sterilizing by mounting handling equipment on an interface of a confinement chamber including a fixed flange defining a chamber opening sealed by a chamber door, the method comprising:
  preparing an assembly including the handling equipment, mounted on a moving flange defining an equipment opening sealed by an equipment door;
  coupling the assembly onto the interface, to connect the moving flange to the fixed flange and the equipment door to the chamber door;
  opening a double door formed by the equipment door and the chamber door connected to one another;
  wherein the confinement chamber is configured to contain a sterile atmosphere, and the preparing of the assembly is followed by:
    sterilizing the assembly; and
    sterilizing the confinement chamber and a hidden part of the interface, after coupling impervious tooling onto the fixed flange and partial opening of the chamber door, wherein imperviousness of the handling equipment is controlled by disconnecting the assembly from the interface and by connecting it to an independent control unit.

3. A method for sterilizing by mounting handling equipment on an interface of a confinement chamber including a fixed flange defining a chamber opening sealed by a chamber door, the method comprising:
  preparing an assembly including the handling equipment, mounted on a moving flange defining an equipment opening sealed by an equipment door;
  coupling the assembly onto the interface, to connect the moving flange to the fixed flange and the equipment door to the chamber door;
  opening a double door formed by the equipment door and the chamber door connected to one another;
  wherein the confinement chamber is configured to contain a sterile atmosphere, and the preparing of the assembly is followed by:
    sterilizing the assembly; and
    sterilizing the confinement chamber and a hidden part of the interface, after coupling impervious tooling onto the fixed flange and partial opening of the chamber door, wherein the double door is opened and is placed in the confinement chamber by a handle mounted on the equipment door, inside the handling equipment.

4. A method for sterilizing by mounting handling equipment on an interface of a confinement chamber including a fixed flange defining a chamber opening sealed by a chamber door, the method comprising:
  preparing an assembly including the handling equipment, mounted on a moving flange defining an equipment opening sealed by an equipment door;
  coupling the assembly onto the interface, to connect the moving flange to the fixed flange and the equipment door to the chamber door;
  opening a double door formed by the equipment door and the chamber door connected to one another;
  wherein the confinement chamber is configured to contain a sterile atmosphere, and the preparing of the assembly is followed by:
    sterilizing the assembly; and
    sterilizing the confinement chamber and a hidden part of the interface, after coupling impervious tooling onto the fixed flange and partial opening of the chamber door, wherein the handling equipment comprises a glove.

5. A method according to claim 1, wherein the assembly is coupled to the interface by controlling a rotation thereof by a removable handling part mounted beforehand on the moving flange.

* * * * *